United States Patent [19]

Shiraishi et al.

[11] Patent Number: 4,687,328
[45] Date of Patent: Aug. 18, 1987

[54] BORE MEASURING SYSTEM

[75] Inventors: Takashi Shiraishi, Nagaokakyo; Shiro Kitamura, Kyoto, both of Japan

[73] Assignee: Enushii Shangyo Co., Ltd., Kyoto, Japan

[21] Appl. No.: 582,845

[22] Filed: Feb. 23, 1984

[30] Foreign Application Priority Data

Mar. 1, 1983 [JP] Japan ............................. 58-34246

[51] Int. Cl.⁴ ............................................. G01B 11/02
[52] U.S. Cl. .................................... 356/384; 356/378; 356/385
[58] Field of Search ................. 356/378, 379, 384–387

[56] References Cited

U.S. PATENT DOCUMENTS

| 3,746,455 | 7/1973 | Flamholz | 356/378 |
| 4,147,052 | 4/1979 | Tsujiuchi et al. | 356/378 |
| 4,463,600 | 8/1984 | Hobbs et al. | 356/378 |
| 4,531,625 | 7/1985 | Yonekura et al. | 356/386 |

FOREIGN PATENT DOCUMENTS 0002175 1/1979 Japan ................................. 356/384

OTHER PUBLICATIONS

"Novel Electro-Optical Instrument for Hole—Diameter Measurement", Fulkner, *IEE Proc.*, vol. 127, 9/1980, pp. 443–445.

Primary Examiner—R. A. Rosenberger
Assistant Examiner—Crystal D. Cooper
Attorney, Agent, or Firm—Austin R. Miller

[57] ABSTRACT

A bore measuring system to optically measure the diameter of hole on thin boards, such as printed circuit boards. The bore measuring system of the invention is so contrived as to irradiate a hole to be measured, to project the light through the hole onto the receiving surface of the image sensor and to indicate the diameter of the hole by converting the output from the image sensor, corresponding to the size of the image, into a numerical figure. Unlike the conventional methods, measurement is possible simply by irradiating the hole to be measured without inserting any pin or measuring rod of a hole gauge into the hole, and without projecting the image to be measured onto a screen. Accordingly, the operation is quite simple and the measuring time can be shortened, yet measuring errors can be avoided. Moreover, the automatic display of hole diameter in a numerical value eliminates the reading errors, which often occur with conventional methods.

11 Claims, 9 Drawing Figures

Counting range under the image sensor. # BORE MEASURING SYSTEM

BACKGROUND OF THE INVENTION

This invention is an apparatus for optical measurement and digital display of hole diameter on thin boards such as printed circuit boards.

Holes on printed boards are ordinarily measured with pin gauges, with a hole gauge, or with a projector.

By the first method, a number of pins with different outside diameters by 0.01 mm each other are inserted into a hole one by one from the smallest to larger ones, and the O.D. of the pin which fits snugly into the hole is taken as the diameter of the hole.

Besides the time required, this method tends to indicate hole diameters to a larger size due to wear by repeated insertion of different pins before the right one is found.

By the second method, a hole gauge (as shown in FIG. 1) is prepared and the measuring rod (1) is inserted into a hole (3) on a printed board (2) to the limit as illustrated, then the stopper (4) comes in contact with the surface of the printed board (2) pushing down the whole printed board. The pointer indication on the dial gauge is read under this condition.

This measure is disadvantageous in that the measuring rod (1) is easily broken in measuring small holes, that skill is required because the measuring rod (1) must be inserted vertically into holes to avoid errors, and that the measuring accuracy is lowered little by little due to wear of the measuring rod (1).

By the projector method, the image of a hole is enlarged and projected onto a screen in order to read the diameter on the scale graduated on the screen.

Disadvantages of this method are errors in visual reading of the scale and longer time required for the measurement.

SUMMARY OF THE INVENTION

The object of the present invention is to measure hole diameters precisely by an optical means. Another object of the present invention is to offer a hole measuring apparatus which can eliminate reading errors through digital display of measured hole diameters. A further object of the present invention is to furnish a bore measuring system which indicates the hole diameter when a hole to be measured placed on the bed is simply irradiated eliminating any need of skillfulness in measurement.

BRIEF DESCRIPTION OF THE INVENTION

Other objects and advantages of the present invention will become apparent in the following description with the accompanying drawings.

DETAILED DESCRIPTION

Figure 2:
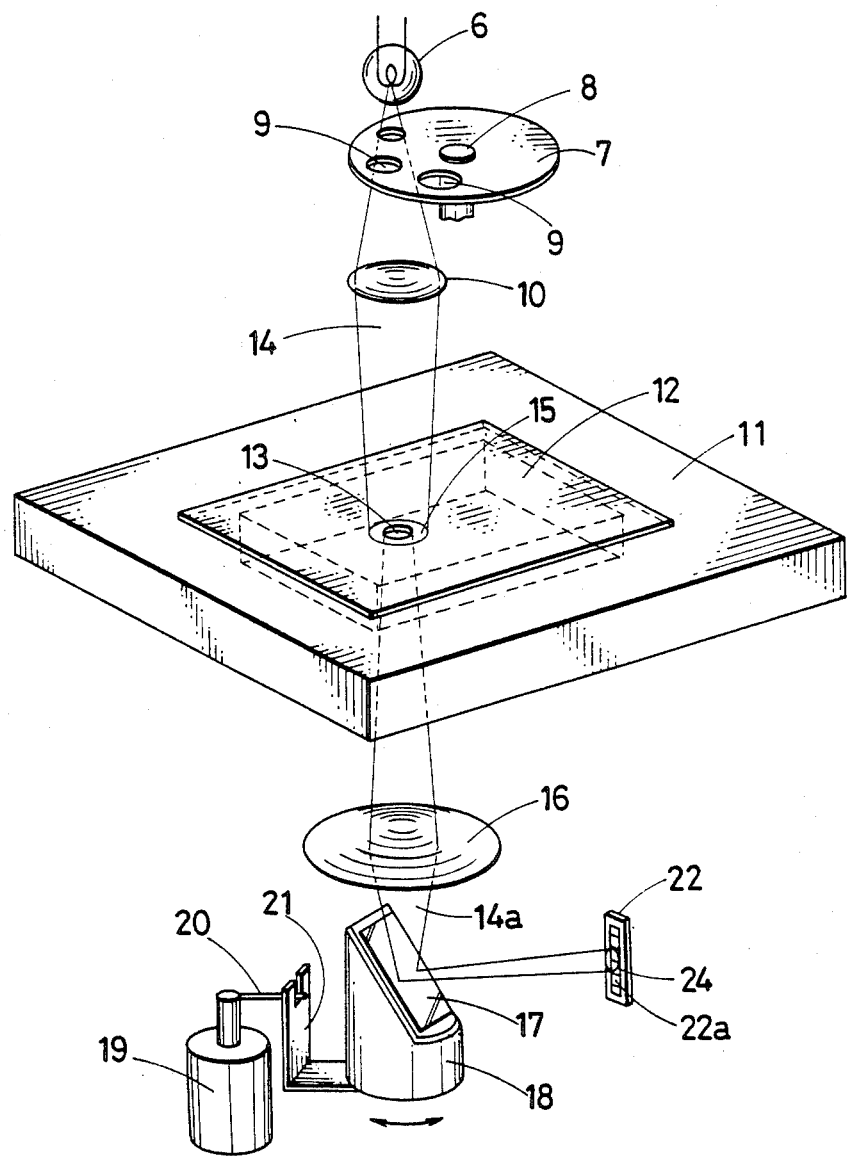
FIG. 2 is an oblique view of the bore measuring system as an embodiment of the present invention; it shows measuring of a hole on a printed board.

In FIG. 2, (6) is the light source of a constant luminous intensity, and (7) is a diaphragm which turns around the axis (8); the diaphragm has two or more holes of different diameters on the periphery.

The diaphragm (7) functions to stop the rays irradiated from the light source (6) (which is shown in FIG. 2 as a tungsten halogen lamp or white lamp) into a luminous flux of an adequate thickness through one of the holes (9).

The lens (10) for illumination converges the light through the hole (9) on the diaphragm (7).

The bed (11) bored at the center is formed to a frame, and is supported by a driving means which is not illustrated here, and is contrived to slide in four-directions.

The printed board (12) having the hole to be measured (13) is put onto the bed (11) so that the hole (13) coincides with the bore (not visible behind the printed board (12)) on the bed (11).

To measure the hole diameter, the hole to be measured (13) is positioned within the convergent light (14) through the lens (10) by sliding the bed (11).

The light spot (15) is formed by the convergent light (14) through the lens (10); the imagery lens (16) is for reconvergence of the light through the hole being measured (13); (17) is a reflector, and (18) is a turning base so composed as to swing to the right and left around the vertical axis (not visible) onto which the reflector (17) is fixed.

Figure 1:
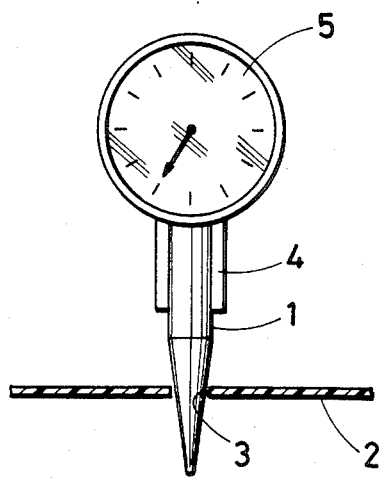
FIG. 1 shows an example of conventional measurement with a dial gauge.
Figure 3:
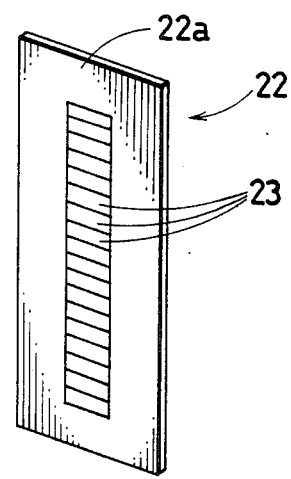
FIG. 3 is an enlarged oblique view of the linear image sensor used for the said bore measuring system.

The servo-motor (19) drives the turning base (18) for right-left swinging at one cycle per two seconds; (20) is the drive shaft, (21) is an interlock connected to the drive shaft (20), and (22) is a linear image sensor (self-scanning type) with a receiving surface (22a) on which a number of photodiodes (23) spaced 25µ apart are arranged in a vertical row, as illustrated in FIG. 3.

The said reflector (17) refracts the convergent rays from the imagery lens (16) and projects them onto the receiving surface (22a) of the linear image sensor (22) to form an optical image (24) (the image of the hole (13) being measured) on the surface.

Figure 4:
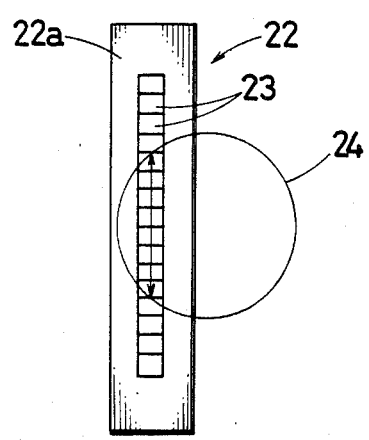
FIG. 4 through FIG. 6 shows the hole of the said printed board projected onto the receiving surface of the image sensor.
Figure 5:
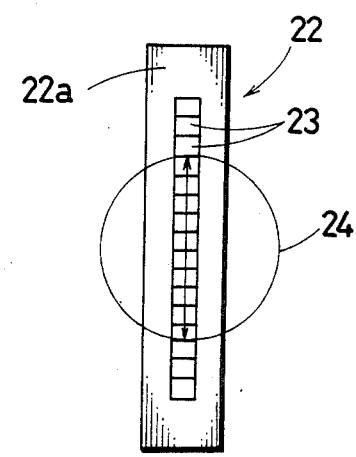
Figure 6:
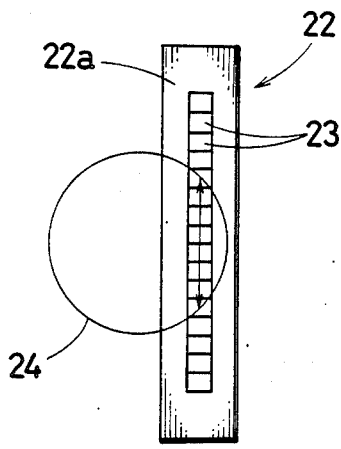

Since the reflector (17) swings to the right and left when driven by the servo-motor (19), the circular projected image (24) moves across the vertical row of photodiodes (23) on the linear image sensor (22), as shown in FIG. 4 to FIG. 6, along with the swing motion of the reflector (17).

While one end of the circular projected optical image (24) goes across the diode train (23), fewer diodes (23) are exposed to the light (as shown by an arrow in FIG. 4), and the output (electric signal) from the linear image sensor (22) is low.

When the center of the circle goes across the diode train, the maximum number of diodes are exposed and the output (electric signal) of the linear image sensor (22) also reaches the maximum, as illustrated in FIG. 5.

When the other end of the circle comes to the diode train (23), (See FIG. 6), the output from the linear image sensor (22) comes down again.

The exact diameter of the hole being measured (13) is found by taking the maximum output from the image sensor (22) (under this condition, the center lines of the projected optical image (24) and of the diode train (23)

coincide and the diameter of the projected image (24) falls within the diode train (23)) as the output corresponding to the diameter of the hole being measured (13).

Practically, it is difficult to accurately position the diameter of the circular projected optical image (24) onto the center line of the diode train (23) on the linear image sensor (22) by accurately positioning the center of the hole to be measured (13) onto the center of the convergent light (14) from the lens (10), i.e. the center of the light spot (15) (see FIG. 2).

In view of the difficulty, the projected optical image (24) is moved horizontally as described above and the maximum output of the linear image sensor (22) is taken as the one which corresponds to the diameter of the hole being measured (13) as the feature of this apparatus.

Thus the diameter is measured precisely even if the hole center (13) is somewhat deflected from the center of the light spot (15). It sometimes happens that the hole being measured (13) is not exactly as designed and is deflected and the image formed on the linear image sensor (22) is deflected in the lengthwise direction of the sensor (22), but the photo-diode train (23) is long enough to absorb the influence completely.

Figure 7:
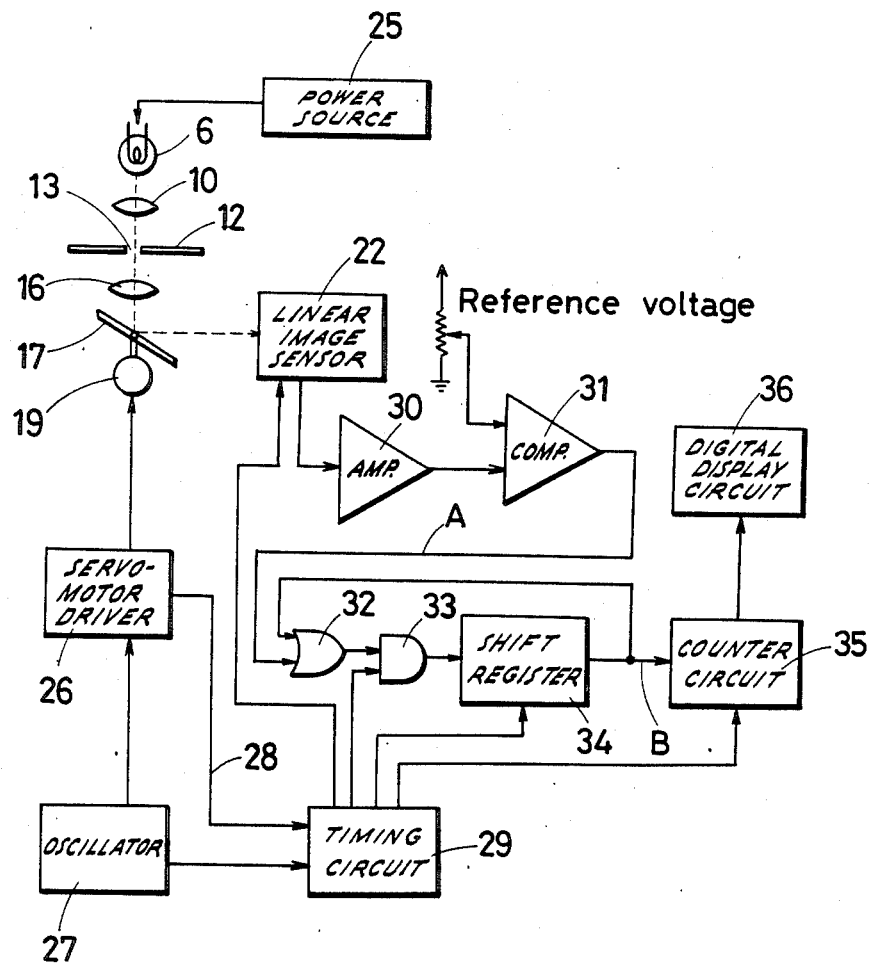
FIG. 7 is the electrical circuit diagram of the bore measuring system of FIG. 2.

FIG. 7 shows the block diagram of the electrical circuit of the bore measuring system, in which (25) is the power source, (6) the light source, (10) the lens for illumination, (12) the printed board, (13) the hole to be measured, (16) the imagery lens, (17) the reflector, (19) the servo-motor, (26) the servo-motor driver, (27) the oscillator, (28) the scanning end signal transmission circuit, (29) the timing circuit, (22) the linear image sensor, (30) the amplifier, (31) the comparator, (32) the OR gate, (33) the AND gate, (34) the shift register, (35) the counter circuit, and (36) is the digital display circuit.

Referring now to FIG. 2 and FIG. 7, an operational description of the bore measuring system goes as follows;

First the system is switched on, and the hole to be measured (13) on the printed board (12) is positioned within the convergent light (14) from the illuminating lens (10). The size of the convergent light (14) can be set adequately by the diaphragm (7).

If the convergent light (14) is large enough to include two holes to be measured (13) placed adjacent to each other (error indication is given under this condition because the optical image of two holes is projected onto the receiving surface (22a) on the linear image sensor but are indicated as the diameter of one hole), the light from the light source (6) is passed through the hole with small diameter (9) by controlling the diaphragm (7) in order to reduce the flux of the convergent light (14) and to position only one hole to be measured (13) within the flux.

By this positioning of the hole being measured (13) within the convergent light (14), the convergent light (14) goes through the hole being measured (13), the imagery lens (16) and the reflector (17) to form the optical image (24) of the hole on the receiving surface (22a) of the linear image sensor (22).

By the OR gate (32), AND gate (33), and shift register (34) (See FIG. 7), the output signal of the image sensor (22) at the preceding scanning (the output signal of the shift register (34)) or the output signal of the image sensor (22) at the present scanning, whichever is larger (wider), is transmitted to the shift register (34).

At the end of the swing motion of the reflector (17), the maximum output signal of the image sensor (22) (the widest) is memorized in the shift register (34).

The signal memorized in the shift register (34) at the end of the swing motion is transfered to the counter circuit (35) for processing and for indication (diameter indication) on the digital display circuit (36).

Having the function to memorize indicated numerical values, the digital display circuit (36) maintains the digital indication up to the counting at the end of the next swing.

In other words, the number on the digital display circuit (36) changes at the end of each swing motion.

Figure 9:
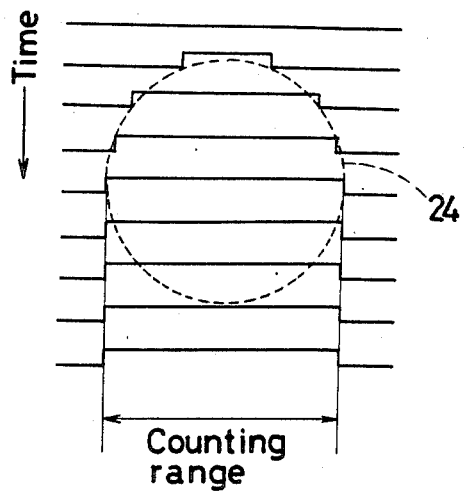
FIG. 9 is a time series signal diagram of the input into the counting circuit.

At part B before the counter circuit (35) the maximum value of the output signals (time series signals) from the image sensor (22) at part A in FIG. 7 is displayed in the middle of the operation and is kept ON as shown in FIG. 9.

Figure 8:
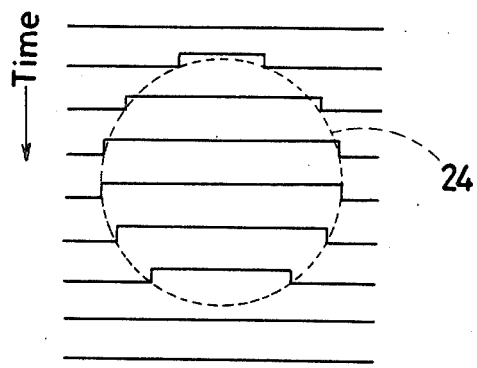
FIG. 8 is a time series output signal diagram of the said linear image sensor.

The circles shown by short dashes lines in FIG. 8 and FIG. 9 are the contour of the projected optical image (24). Because of the operation as described above, the value indicated on the display circuit (36) at the initial stage is smaller than the actual diameter, but the value equivalent to the actual diameter is eventually indicated and is kept on.

Being composed as described above, the bore measuring system automatically indicates hole diameters digitally when a printed board (12) is placed on the bed (11) and the hole to be measured (13) is simply positioned into the convergent light (14) coming out of the illumination lens (10).

Accordingly, the operation is quite easy and no skill is required for the measurement. Moreover, the digital display of the measured hole diameter is completely free from any reading error. Optical measurement, in place of the conventional measurement with a measuring rod inserted into a hole to be measured, also eliminates the possible trouble that the measured hole is expanded and the expanded diameter is then measured.

Although the reflector (17) is so composed to swing horizontally in the above embodiment, the swing drive direction is not limit thereto.

As the image sensor (22), a charge coupled device (CCD) may also be employed as the sensor element.

While the above-described embodiment represents the preferred form of the present invention, it is particularly understood that modifications are possible within the scope of the appended claims.

What is claimed is:

1. A bore measuring system comprising a light source in the form of a white lamp or a tungsten halogen lamp: an illuminating lens arranged to converge rays from said light source: a diaphragm having two or more holes of different diameters arranged to stop the light from said light source through any one of the holes before reaching said illuminating lens: an imagery lens positioned for reconvergence of the light through said hole to be measured and through the illuminating lens: an image sensor arranged to receive the light onto the receiving surface and including a number of sensor elements arranged in a row and to transmit signal output from exposed sensor elements only as the sensor output: a reflector positioned to refract the convergent light from said imagery lens and to project onto the receiving surface of said image sensor for optical image formation: a driving means connected to swing the reflector so that the optical image goes across the sensor elements on the image sensor: a signal output circuit connected to compare two successive output signals from the image sensor and to transmit the larger signal: and a display circuit connected to the output circuit to indicate the hole diameter based on the output signal from said signal output circuit.

2. A bore measuring system according to claim 1, wherein the sensor elements are arranged in a vertical row on the image sensor and the reflector is so composed to swing horizontally.

3. A bore measuring system in accordance with claim 1 or claim 2 in which photo-diodes are used as the sensor element of the image sensor.

4. Apparatus for measuring the size of a bore in a test object comprising:
   a light source;
   a first lens spaced apart from said light source to converge light emanating therefrom;
   a diaphragm having a plurality of holes of different diameters, spaced between said light source and said first lens, and arranged to permit light to pass through one of said holes in the direction of said first lens;
   a second lens spaced apart from said first lens and positioned for reconvergence of light passing through said bore;
   swingable reflection means arranged to refract convergent light from said second lens;
   image sensing means positioned to receive refracted convergent light from said swingable refraction means for forming optical images therefrom; and
   conversion means to convert said optical images into electrical output signals for display.

5. Apparatus as defined in claim 4 wherein said light source is in the form of a white lamp or a tungsten halogen lamp.

6. Apparatus as defined in claim 4 further comprising means for holding said test object between said first and second lenses.

7. Apparatus as defined in claim 4 wherein said image sensing means includes an image sensor having a plurality of sensor elements arranged in a row.

8. Apparatus as defined in claim 4 wherein said swingable reflection means is a mirror.

9. Apparatus as defined in claim 4 further comprising driving means to swing said swingable reflection means.

10. Apparatus as defined in claim 4 wherein said conversion means includes a signal electrical output circuit connected to compare two successive output signals from said image sensing means and to transmit the larger signal for display.

11. Apparatus as defined in claim 10 wherein said conversion means further includes a display circuit connected to said signal output circuit for indicating the bore diameter based on the output signal from said signal output circuit.

* * * * *